United States Patent
Koskinen et al.

(10) Patent No.: US 12,184,485 B2
(45) Date of Patent: Dec. 31, 2024

(54) AUTOMATIC COMMISSIONING FOR AN ELEVATOR SIGNALIZATION NETWORK DEVICE

(71) Applicant: KONE Corporation, Helsinki (FI)

(72) Inventors: Santtu Koskinen, Helsinki (FI); Mikko Piironen, Helsinki (FI); Anssi Rantamäki, Helsinki (FI); Mikko Heiskanen, Helsinki (FI); Ari Koivisto, Helsinki (FI); Mikko Mattila, Helsinki (FI)

(73) Assignee: KONE CORPORATION, Helsinki (FI)

( * ) Notice: Subject to any disclaimer, the term of this patent is extended or adjusted under 35 U.S.C. 154(b) by 576 days.

(21) Appl. No.: 17/205,477

(22) Filed: Mar. 18, 2021

(65) Prior Publication Data

US 2021/0211355 A1    Jul. 8, 2021

Related U.S. Application Data

(63) Continuation of application No. PCT/FI2018/050742, filed on Oct. 16, 2018.

(51) Int. Cl.
  *H04W 4/00* (2018.01)
  *B66B 1/34* (2006.01)
  *B66B 1/46* (2006.01)
  *B66B 25/00* (2006.01)
  (Continued)

(52) U.S. Cl.
  CPC ........ *H04L 41/0816* (2013.01); *B66B 1/3407* (2013.01); *B66B 1/3453* (2013.01); *B66B 25/00* (2013.01)

(58) Field of Classification Search
  None
  See application file for complete search history.

(56) References Cited

U.S. PATENT DOCUMENTS

| | | |
|---|---|---|
| 6,216,172 B1 | 4/2001 | Kölblin et al. |
| 8,891,423 B2 | 11/2014 | Shaheen et al. |
| 9,537,808 B1 | 1/2017 | Giansiracusa et al. |

(Continued)

FOREIGN PATENT DOCUMENTS

| | | |
|---|---|---|
| CN | 103647782 B | 2/2017 |
| EP | 2 258 649 A1 | 12/2010 |
| EP | 2587725 A1 | 5/2013 |
| EP | 3 318 523 A1 | 5/2018 |
| EP | 3 062 541 A1 | 8/2018 |
| EP | 3 381 851 A2 | 10/2018 |

(Continued)

OTHER PUBLICATIONS

Cisco, "Connected Rail Solution Design Guide," URL: https://www.cisco.com/c/dam/en_us/solutions/industries/docs/cts-dg.pdf, Nov. 2016, XP055613499, 42 pages total.

(Continued)

*Primary Examiner* — Sai Aung
(74) *Attorney, Agent, or Firm* — Birch, Stewart, Kolasch & Birch, LLP

(57) ABSTRACT

A commissioning arrangement for elevator and escalator network devices is disclosed. When the elevator network devices are connected to the elevator network they first get a unique communication address from another network element that is typically a network switch located higher in the chain of network switches. Then, using the established communication address, the network element contacts an automatic commissioning service for acquiring network configuration settings.

4 Claims, 2 Drawing Sheets

(51) Int. Cl.
*H04L 41/0816* (2022.01)
*H04W 4/02* (2018.01)

(56) References Cited

U.S. PATENT DOCUMENTS

| | | | |
|---|---|---|---|
| 2009/0022131 | A1 | 1/2009 | Rusanen et al. |
| 2009/0288919 | A1* | 11/2009 | Flynn ................. B66B 1/468 187/247 |
| 2012/0066356 | A1 | 3/2012 | Nguyen et al. |
| 2012/0145487 | A1 | 6/2012 | Yoo |
| 2014/0045479 | A1 | 2/2014 | Shinada et al. |
| 2016/0337181 | A1 | 11/2016 | Cathrow et al. |
| 2017/0190543 | A1* | 7/2017 | Friedli ................. H04W 4/00 |
| 2018/0099840 | A1 | 4/2018 | Armistead |
| 2019/0225457 | A1* | 7/2019 | Koivisto ............. B66B 1/3461 |
| 2019/0377567 | A1* | 12/2019 | Keshri ................. G06N 20/00 |
| 2021/0053767 | A1* | 2/2021 | Panula ................. B66B 1/3407 |
| 2021/0371232 | A1* | 12/2021 | Huron ................. B66B 1/3453 |

FOREIGN PATENT DOCUMENTS

| | | |
|---|---|---|
| EP | 3 381 852 A2 | 10/2018 |
| WO | WO 2007/061405 A2 | 5/2007 |
| WO | WO 2007/093665 A1 | 8/2007 |
| WO | WO 2010/087815 A1 | 8/2010 |
| WO | WO 2012/118711 A2 | 9/2012 |
| WO | WO 2014/122357 A1 | 8/2014 |
| WO | WO 2015/084396 A1 | 6/2015 |
| WO | WO 2015/177020 A1 | 11/2015 |
| WO | WO 2018/050654 A1 | 3/2018 |

OTHER PUBLICATIONS

Cisco, "Understanding CHAP authentication," URL: https://www.cisco.com/c/en/us/support/docs/wan/point-to-point-protocol-ppp/25647-understanding-ppp-chap.pdf, Oct. 21, 2015, XP055600402, 10 pages total.
International Search Report for International Application No. PCT/EP2018/078149, dated Mar. 28, 2019.
International Search Report for International Application No. PCT/FI2018/050742, dated Jul. 18, 2019.
International Search Report for International Application No. PCT/FI2018/050743, dated Jul. 5, 2019.
International Search Report for International Application No. PCT/FI2018/050744, dated Sep. 4, 2019.
International Search Report for International Application No. PCT/FI2018/050745, dated Jul. 8, 2019.
International Search Report for International Application No. PCT/FI2018/050746, dated Sep. 24, 2019.
International Search Report for International Application No. PCT/FI2018/050747, dated Jul. 8, 2019.
International Search Report for International Application No. PCT/FI2018/050748, dated Jul. 5, 2019.
Written Opinion of the International Searching Authority for International Application No. PCT/EP2018/078149, dated Mar. 28, 2019.
Written Opinion of the International Searching Authority for International Application No. PCT/FI2018/050742, dated Jul. 18, 2019.
Written Opinion of the International Searching Authority for International Application No. PCT/FI2018/050743, dated Jul. 5, 2019.
Written Opinion of the International Searching Authority for International Application No. PCT/FI2018/050744, dated Sep. 4, 2019.
Written Opinion of the International Searching Authority for International Application No. PCT/FI2018/050745, dated Jul. 8, 2019.
Written Opinion of the International Searching Authority for International Application No. PCT/FI2018/050746, dated Sep. 24, 2019.
Written Opinion of the International Searching Authority for International Application No. PCT/FI2018/050747, dated Jul. 8, 2019.
Written Opinion of the International Searching Authority for International Application No. PCT/FI2018/050748, dated Jul. 5, 2019.

* cited by examiner

AUTOMATIC COMMISSIONING FOR AN ELEVATOR SIGNALIZATION NETWORK DEVICE

CROSS REFERENCE TO RELATED APPLICATIONS

This application is a Continuation of PCT International Application No. PCT/FI2018/050742, filed on Oct. 16, 2018, which is hereby expressly incorporated by reference into the present application.

DESCRIPTION OF BACKGROUND

The following description relates to elevators and escalators. More particularly the description relates to commissioning of peripheral devices transportation infrastructure control network.

Modern elevators are network connected devices that can be accessing resources from one or more external entities providing services to elevators and escalators for the benefit of passengers. In addition to the improvement of passenger comfort and efficiency, the network connectivity may be used for several other purposes, for example entertainment or data collection.

Nowadays the network connectivity does not only relate to external devices connected to an elevator system. Even some components that are relevant or even essential for normal operation of an elevator or escalator group can be connected using data communication networks.

In this description, these components are referred to as applications. The applications may be implemented as hardware or software. Many applications involving hardware also include software, and software applications may be executed in a server or central computing resource. Thus, an application can be described as an entity providing services to requesting clients. An example of an application is a group controller. An example of a client is a destination operating panel installed in an elevator arrangement.

Current elevators use a network arrangement that is in this description referred to as a transportation infrastructure control network (TICN). A TICN can be a combination of wired and wireless network solutions.

The TICN is used for connecting elevator and escalator components together. Particularly, they are used for connecting Elevator Escalator Peripheral Devices (EEPD) to the elevator arrangement. When new peripheral devices, which are here discussed as an example of client entities, are added to the elevator or escalator arrangement, the peripheral devices must be detected and connected to the network appropriately. The same applies when already existing peripheral devices need to be disconnected and then reconnected to the arrangement. Further needs may arise from other possible reorganizing related tasks.

Even if the TICN is most commonly used for data communications related to elevators and escalators, it can also be used for controlling, for example, access gates, display panels and the like. It is not necessary that the TICN is coupled with elevators and escalators, and the TICN can be used, for example, for access gates only. In this application the TICN is understood to be a separate physical network originally designed for transportation infrastructure purposes only.

As discussed above, attaching peripheral devices and other devices to an TICN may require a complicated configuration process. Conventionally, the configuration process has been made easier by using pre-configured devices; however, in modern elevator arrangements this is a difficult task as the elevator system may be a part of a building network that is complicated and continuously changed. Furthermore, these devices are commonly installed in spaces with limited access. An example of such limited space is the elevator shaft. Typically, working in elevator shafts requires a special qualification for elevator environment.

When networks are built into modern buildings, the number of network elements, such as switches, may be very high. For example, it is possible that each elevator shaft has a network switch or router on each landing floor level. These network switches form a complicated network topology. Thus, there is a need for configuring these network elements that provide a base for an TICN.

SUMMARY

In the following description, a commissioning arrangement for elevator and escalator network devices is disclosed. When the elevator network devices are connected to the elevator network they first get a unique communication address from another network element that is typically a network switch located higher in the chain of network switches. Then, using the established communication address, the network element contacts an automatic commissioning service for acquiring network configuration settings.

In an aspect a method for connecting a network switch to a transportation infrastructure control network is disclosed. The method comprises connecting or disconnecting a network element to the transportation infrastructure control network; receiving, at the network element, a unique communication address from a second network element; requesting configuration settings from an automatic commissioning service; and receiving the requested configuration settings at the network element.

The method provides a possibility to install or replace network elements in a transportation infrastructure control network on the shaft side without a need for pre-configuration or on-site configuration by a maintenance man. Thus, the automatic commissioning arrangement provides a possibility to install complicated networks that are formed of several network elements that are located in elevator shafts or similar restricted areas. The method further provides an efficient arrangement for finding the most appropriate network configuration settings, as in the method the network topology and locations of the network elements can be determined when the network elements are already installed at their final locations.

In an implementation of the method the second network element is the automatic commissioning service or a core switch. The method may be used for installing the core switch, wherein the automatic commissioning service provides all necessary configurations to the core switch that is being installed to the network. Thus, the same method can be applied to all switches.

In an implementation of the method the network element is a core switch or a shaft switch. The method may be used for installing all kinds of switches, wherein the automatic commissioning service provides the final configuration to the requesting switch that is being installed to the network after the neighboring switch has provided the unique communication address. Thus, the same method can be applied to all switches.

In an implementation of the method the network element is a router. It is beneficial to be able to handle also routed L2 networks.

In an aspect a computer program comprising computer executable computer program code is disclosed. The computer program code is configured to perform a method as described above when the computer program is executed in a computing device. It is beneficial that the computer program can be used in all switches in order to implement the embodiments. The computer program may be executed in parallel in a plurality of devices or conventionally in each device.

In an aspect a transportation infrastructure arrangement comprising a data communication network is disclosed. The data communication network comprises an automatic commissioning service; a core switch, wherein the core switch is connected to the automatic commissioning service; and at least one shaft switch, wherein the shaft switches are connected to the core switch directly or through another shaft switch.

The arrangement provides a possibility to install or replace network elements in a transportation infrastructure control network on the shaft side without a need for pre-configuration or on-site configuration by a maintenance man. Thus, the automatic commissioning arrangement provides a possibility to install complicated networks that are formed of several network elements that are located in elevator shafts or similar restricted areas. The arrangement further provides an efficient arrangement for finding the most appropriate network configuration settings, as in the arrangement the network topology and locations of network elements can be determined when the network elements are already installed in their final locations.

In an implementation the shaft switches are arranged as a chain in at least one elevator shaft. It is beneficial that the arrangement can provide a network to all elevator shafts independently.

In an implementation the core switch is configured to request a unique communication address and configuration settings from the automatic commissioning service. It is beneficial that the automatic commissioning service is capable of providing unique communication addresses so that the method can be used for all switches including the core switch.

In an implementation the elevator and escalator arrangement comprises a plurality of elevator groups and each of the groups comprises an automatic commissioning service assigned for the group. It is beneficial that each of the elevator groups has own automatic commissioning service so that full functionality can be dedicated for elevators in the group. This arrangement can increases fault tolerance.

The aspects and implementations described above provide a flexible arrangement for a transportation infrastructure. When a network element needs to be installed or replaced, an elevator shaft certified technician can make the installation in the elevator shaft, and the technician does not need to be skilled in network configurations. A further benefit of the aspects and implementations described above is that there is no need for complicated pre-configurations made by data communication experts. Pre-configuring the components of a possibly complex elevator network is a difficult task, and thanks to the automatic commissioning it can be avoided. Thus, this reduces the likelihood that the initial configuration is incorrect and the installed switch needs to be visited by a maintenance man.

BRIEF DESCRIPTION OF THE DRAWINGS

The accompanying drawings, which are included to provide a further understanding of the automatic commissioning for elevator signalization network devices and constitute a part of this specification, illustrate example embodiments and together with the description help to explain the principles of the automatic commissioning for elevator signalization network devices. In the drawings.

DETAILED DESCRIPTION

Reference will now be made in detail to the embodiments, examples of which are illustrated in the accompanying drawings.

In the following description, an elevator is used as an example. The arrangement is also suitable for escalators and systems comprising both elevators and escalators. In the following description an addition of a switch is disclosed as an example, however, same principles can be applied when adding a router to the network. Furthermore, the similar principles may be used when a network element is removed from the network or the network topology is modified in some other manner.

Figure 1:
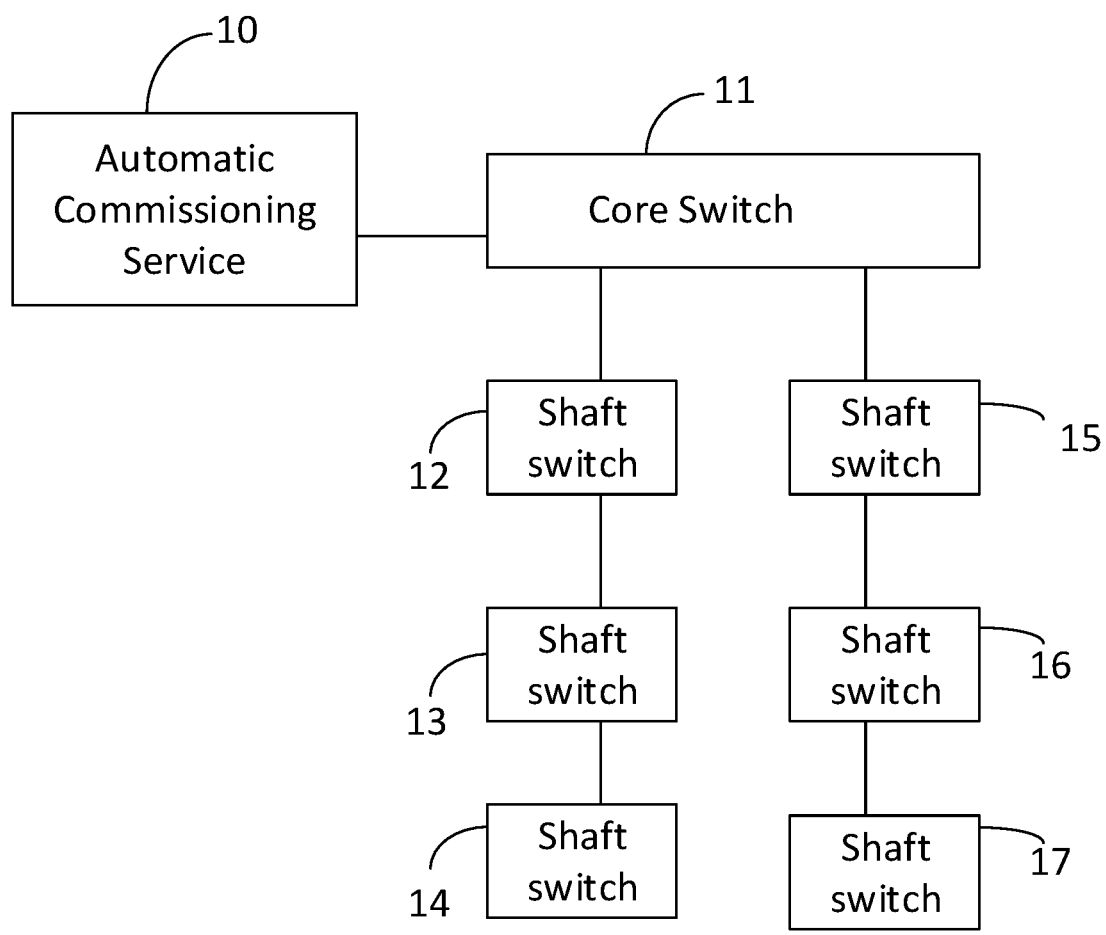
FIG. 1 is a block diagram of an example network used in an elevator and escalator environment.

In FIG. 1 a block diagram of an example network arrangement that can be used in an elevator and escalator environment is shown. In the figure, the actual elevator or escalator components are not shown. The elevator typically comprises at least an elevator car arranged into an elevator shaft. The elevator car is coupled to hoisting ropes. The ropes are operated by a hoisting machine. The hoisting ropes may be connected to a counterweight. The elevator typically has a landing possibility in each of the floors of a building. The landing side doors, calling panels, destination control panels and such devices are commonly connected to a network that is commonly called a transportation infrastructure control network.

FIG. 1 shows an example of a network involving to elevator shafts. The first elevator shaft comprises shaft switches 12-14 and the second elevator shaft comprises shaft switches 15-17. In the example of FIG. 1, the elevator shows three floors; however, the number of floors is not limited to three. Furthermore, in high buildings it is common that all elevators do not stop at each of the floors.

In FIG. 1, both shaft switches 12-14 and 15-17 form a chain of switches that are connected to a core switch 11, which is further configured to connect the shaft switches to external components, such as transportation infrastructure network controller and other networks. The core switch 11 is further configured to an automatic commissioning service 10.

The arrangement shown in FIG. 1 is understood to be an example and the automatic commissioning service 10 may be connected to the network also in other ways provided that the commissioning service is capable of providing the service to all requesting devices. Furthermore, there may be more than one automatic commissioning service 10 instance for providing redundancy. The automatic commissioning service may be identically duplicated or functionally different service instances may be provided.

A shaft switch is a network switch that is located in an elevator shaft or in the direct vicinity of an elevator shaft. Thus, commonly a qualification for shaft work is required for installing a shaft switch. A shaft switch is configured to receive and transmit data for elevator use, wherein the data may be critical for the use of the elevator. These switches may also be used for non-critical data transmissions and data communications that do not relate to the use of the elevator; however, this is not necessary.

Figure 2:
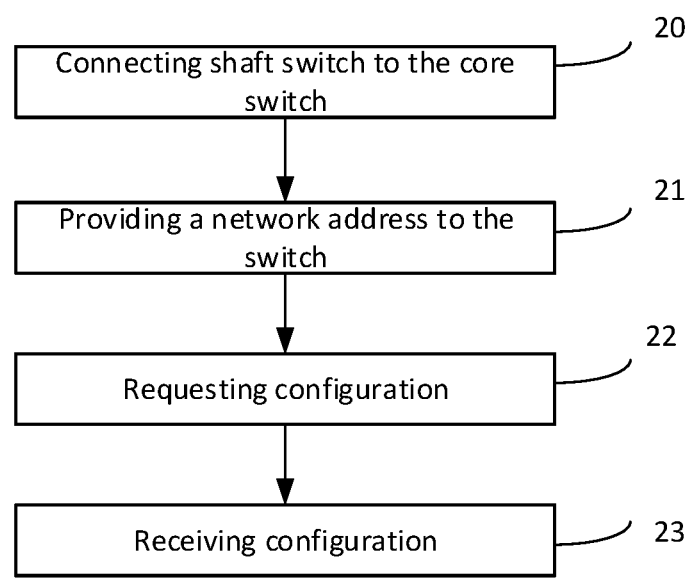
FIG. 2 is a block diagram of an example method.

FIG. 2 shows an example of a method wherein a shaft switch is connected to a network. An example of a network is the network of FIG. 1, or any similar network that is used in elevators.

In the starting situation of the method, the network comprises at least an automatic commissioning service and a core switch, which is connected to the automatic commissioning service. The core switch may be connected to other network components, such as other switches, routers or gateways that provide access to other networks or the internet. These additional components may also be incorporated with the automatic commissioning service.

When the initial situation is constructed, the core switch is connected to the automatic commissioning service. The automatic commissioning service provides a unique communication address, such as a network address, to the core switch. Then, the core switch requests full network configuration from the automatic commissioning service and starts using the configuration given by the automatic commissioning service.

The example method of FIG. 2 is initiated by connecting a shaft switch to the core switch. An example of a shaft switch can be, for example, shaft switch 12 of FIG. 1, step 20. The connecting is typically done by installing a network switch to a shaft location and by connecting the shaft switch to the core switch using a network cable. In some installations the switches may be connected to the core switch using wireless technologies.

When the shaft switch has been connected to the core switch, the core switch will provide the shaft switch with a unique communication address, step 21. The shaft switch may use the unique communication address when communicating with other network elements and devices in the network.

The shaft switch will request configuration or network settings from an automatic commissioning service, step 22. The automatic commissioning service recognizes the position of the shaft switch in the topology and generates the correct configuration for the shaft switch. Then the generated configuration is transmitted to the shaft switch and received at the shaft switch.

In FIG. 1, three shaft switches per elevator shaft were shown. The process for shaft switches 13 and 14 is similar to shaft switch 12, except that the unique communication address is requested from a shaft switch to which the requesting shaft switch is connected. For example, shaft switch 13 will receive the unique communication address from shaft switch 12. The automatic commissioning service is then contacted in the same manner as in the example of FIG. 2. The whole chain of shaft switches is processed accordingly.

In FIG. 1, two shafts were shown. The first shaft comprises shaft switches 12-14 and the second shaft comprises shaft switches 15-17. Both shafts are processed independently, and both are connected to the core switch accordingly. Similar principles can be applied in buildings having more elevator shafts and more shaft switches due to a larger number of floors.

The above described methods may be implemented as computer software which is executed in a computing device that can be connected to a data communication network. When the software is executed in a computing device, it is configured to perform the above described inventive method. The software is embodied on a computer readable medium, so that it can be provided to the computing device, such as the core switch or shaft switches of FIG. 1.

As stated above, the components of the exemplary embodiments can include a computer readable medium or memories for holding instructions programmed according to the teachings of the present embodiments and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the automatic commissioning for elevator signalization network devices may be implemented in various ways. The automatic commissioning for elevator signalization network devices and its embodiments are thus not limited to the examples described above; instead they may vary within the scope of the claims.

The invention claimed is:

1. A method for changing configuration of network elements in a transportation infrastructure control network which includes an automatic commissioning service; and a core switch connected to the automatic commissioning service, said method comprising the steps of:
    requesting, by the core switch, a first unique communication address and configuration settings from the automatic commissioning service;
    connecting or disconnecting a network element to the transportation infrastructure control network, the network element being connected to the core switch;
    receiving, at the network element, a second unique communication address from the core switch;
    requesting configuration settings from an automatic commissioning service by using the second unique communication address; and
    receiving the requested configuration settings at the network element.

2. The method according to claim 1, wherein the network element is a shaft switch.

3. The method according to claim 1, wherein the network element is a router.

4. A computer program embodied on a non-transitory computer readable medium and comprising computer executable computer program code, wherein when the computer program is executed in a computing device, the computer program code is configured to perform a method for changing configuration of network elements in a transportation infrastructure control network which includes an automatic commissioning service; and a core switch connected to the automatic commissioning service, comprising:
    requesting a first unique communication address and configuration settings from the automatic commissioning service for the core switch;
    connecting or disconnecting a network element to the transportation infrastructure control network, the network element being connected to the core switch;
    receiving, at the network element, a second unique communication address from the core switch;

requesting configuration settings from an automatic commissioning service by using the second unique communication address; and receiving the requested configuration settings at the network element.

* * * * *